(12) United States Patent
Merh et al.

(10) Patent No.: US 12,296,960 B2
(45) Date of Patent: May 13, 2025

(54) LEG RESTRAINT SYSTEM WITH COMPLIANCE INDICATOR

(71) Applicant: B/E Aerospace, Inc., Winston-Salem, NC (US)

(72) Inventors: Rahul Merh, Hyderabad (IN); Lakshmana Kumar Marineni, Hyderabad (IN); Tippanna Channabasappa Shetgar, Hyderabad (IN); Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 29 days.

(21) Appl. No.: 18/235,077

(22) Filed: Aug. 17, 2023

(65) Prior Publication Data
US 2024/0308667 A1    Sep. 19, 2024

(30) Foreign Application Priority Data
Mar. 13, 2023  (IN) .............................. 202311016682

(51) Int. Cl.
| | | |
|---|---|---|
| *G08B 23/00* | (2006.01) | |
| *B64D 11/06* | (2006.01) | |
| *B64D 45/00* | (2006.01) | |
| *G08B 21/22* | (2006.01) | |

(52) U.S. Cl.
CPC ............ *B64D 11/062* (2014.12); *B64D 45/00* (2013.01); *G08B 21/22* (2013.01)

(58) Field of Classification Search
CPC ....... B64D 11/062; B64D 45/00; G08B 21/22
USPC ....................................................... 340/573.1
See application file for complete search history.

(56) References Cited

U.S. PATENT DOCUMENTS

| | | | |
|---|---|---|---|
| 5,413,378 A | 5/1995 | Steffens, Jr. et al. | |
| 6,217,059 B1* | 4/2001 | Brown .................... | B60R 21/16 280/730.2 |
| 6,443,488 B1 | 9/2002 | Kippelt et al. | |
| 6,904,347 B1 | 6/2005 | Berenz et al. | |
| 7,393,007 B2 | 7/2008 | Kumagai | |
| 8,894,095 B1 | 11/2014 | Meister et al. | |
| 9,139,114 B2 | 9/2015 | Meister et al. | |
| 9,283,911 B2* | 3/2016 | Nagasawa ......... | B60R 21/01552 |

(Continued)

OTHER PUBLICATIONS

European Patent Office, Extended European Search Report received in EP Application No. 24163231.4, Jul. 9, 2024, 5 pages.

*Primary Examiner* — Tai T Nguyen
(74) *Attorney, Agent, or Firm* — Suiter Swantz IP (57) ABSTRACT

A leg restraint system for a side facing seat provided in an aircraft or other conveyance. The system includes a leg restraining device including a panel configured to deploy along a deployment path when a sensed condition is met, a sensor configured to monitor the deployment path, and an indicator configured to indicate information regarding the monitored deployment path. A controller communicatively coupled to the sensor and indicator receives information and instructs the indicator to indicate a compliance status of the leg restraining device. In embodiments, an object positioned in the deployment path of the leg restraining device causes a noncompliant status to be indicated to a seated occupant thereby causing corrective action to be taken such that the leg restraining device can be operated as intended.

20 Claims, 8 Drawing Sheets

(56) References Cited

U.S. PATENT DOCUMENTS

| | | |
|---|---|---|
| 9,296,317 B2 | 3/2016 | Meister et al. |
| 9,315,271 B2 | 4/2016 | Oleson et al. |
| 9,561,769 B2 | 2/2017 | Himel |
| 10,569,890 B2 * | 2/2020 | Moeller .................. B64D 25/02 |
| 11,059,589 B2 | 7/2021 | Oleson et al. |
| 11,407,341 B2 | 8/2022 | Simecek et al. |
| 2014/0353951 A1 * | 12/2014 | Meister ............ B64D 11/06205 |
| | | 280/730.1 |
| 2016/0052636 A1 | 2/2016 | Moeller et al. |
| 2020/0039651 A1 | 2/2020 | Oleson et al. |

\* cited by examiner

LEG RESTRAINT SYSTEM WITH COMPLIANCE INDICATOR

CROSS-REFERENCE AND INCORPORATION BY REFERENCE

This US nonprovisional patent application claims the benefit of priority of India Provisional Patent Application No. 20/2311016682 filed Mar. 13, 2023, which is hereby incorporated by reference in its entirety.

TECHNICAL FIELD AND BACKGROUND

The present disclosure relates generally to safety systems for side facing seats in aircraft and other conveyances, and more particularly, to a leg restraint system including a deployable leg restraint device, a sensor configured to monitor a deployment path of the device, and an indicator configured to indicate a compliance status associated with the deployment path. In use, an indication of noncompliance informs the seat occupant to take corrective action such that the device can function as intended.

Sudden and abrupt vehicle decelerations may cause injury to the vehicle occupants, particularly when the occupants are not properly restrained. When the vehicle includes side facing seats, i.e., seats that face substantially perpendicular to the direction of travel, leg injuries may occur as a result of unrestrained lateral and rotational lower leg movements. Such movements may be referred to as leg flail, i.e., a condition in which the unrestrained lower leg moves in the direction of travel potentially causing knee injuries, femur bone torsion, etc.

Figure 1A:
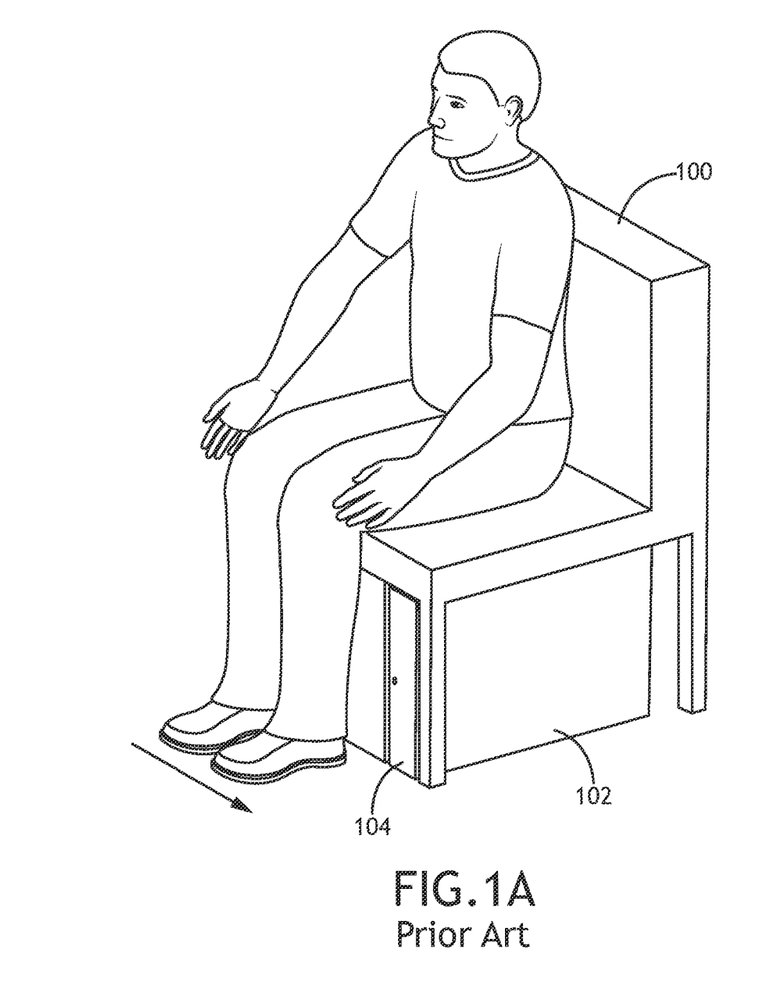
FIG. 1A is a perspective view of a non-limiting example of a side facing seat equipped with a leg restraint device according to the prior art, showing the device in a retracted condition.
Figure 1B:
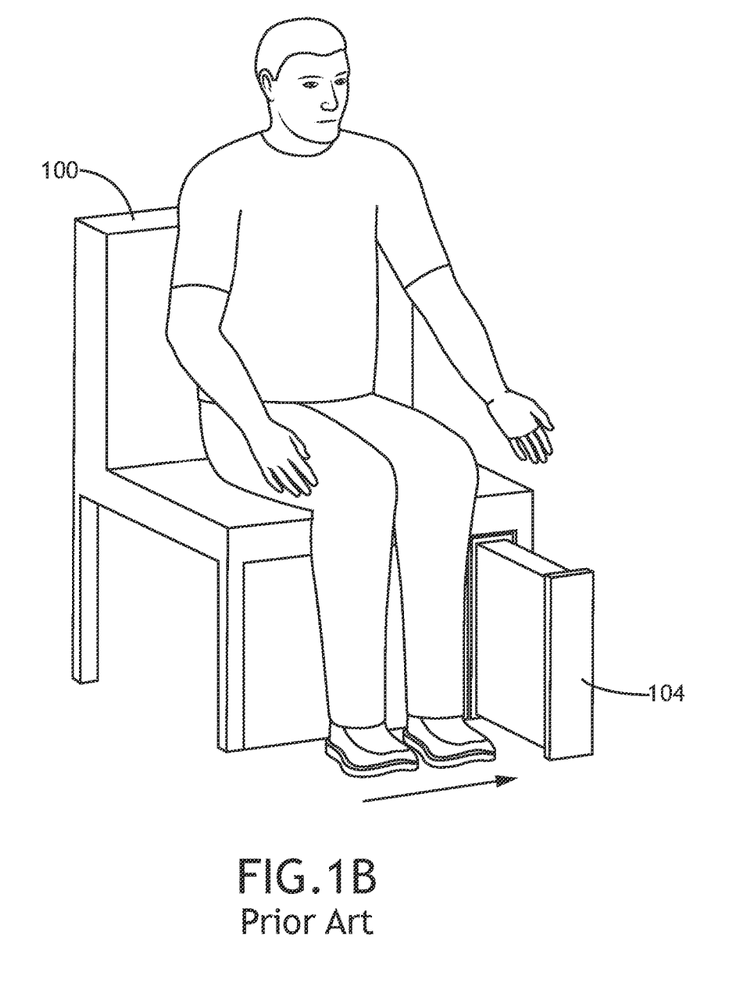
FIG. 1B is a perspective view of the side facing seat of FIG. 1A, showing the leg restraint device in a deployed condition.
Figure 1C:
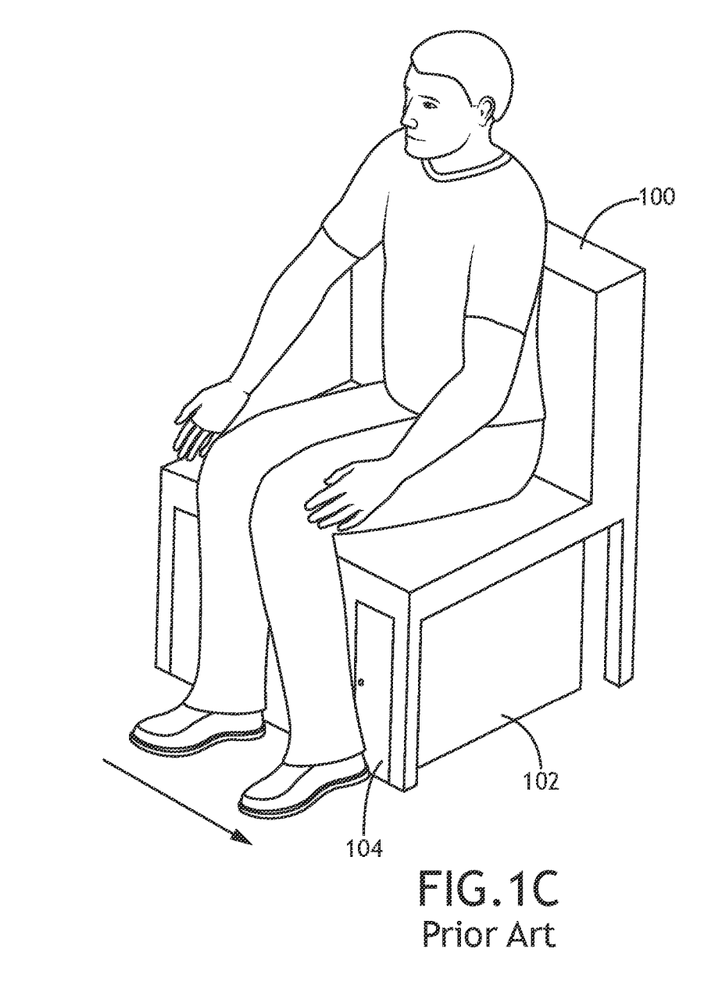
FIG. 1C is a perspective view of the side facing seat of FIG. 1A, showing the leg restraint device in the retracted condition and the lower leg positioned in the deployment path of the leg restraint device.

To constrain lower leg movements, side facing seats 100 may be equipped with leg flail devices 102 configured to activate during a sudden deceleration event. For example, referring to FIGS. 1A and 1B, a non-limiting example of a leg flail device 102 is shown positioned at the forward end of the seat 100, for instance under the seat 100. The device 102 generally includes an internal mechanism configured to activate, in some cases under extreme force, to drive outward deployment of a brace 104 configured to interact with the lower leg to prevent lower leg lateral and rotational movements. While effective, such devices require the lower leg to be in the proper position prior to the deployment of the brace 104. If the lower leg is not properly positioned prior to deployment, for example when the lower leg is positioned directly in the deployment path as shown in FIG. 1C, the deploying panel 104 may engage the lower leg thereby driving the lower leg forward and causing further injury.

Therefore, there is a need to detect the position of the lower leg prior to deploying a lower leg restraint device, such that the lower leg can be repositioned as necessary for the device to function as intended.

BRIEF SUMMARY

To achieve the foregoing and other advantages, according to a first aspect, the present disclosure provides a leg restraint system for a side facing seat. The system includes a leg restraining device configured to be positioned in proximity to a side facing seat, the leg restraining device including a panel configured to deploy along a deployment path. The system further includes a sensor configured to be positioned relative to the leg restraining device and configured to monitor the deployment path, an indicator configured to indicate information regarding the monitored deployment path, and a controller communicatively coupled to each of the sensor and the indicator. In use, the controller is configured to receive from the sensor information regarding the monitored deployment path, and in response instruct the indicator to indicate a compliance status associated with the monitored deployment path.

In some embodiments, the information regarding the monitored deployment path includes object detection information, and the controller is further configured to instruct the indicator to indicate the compliance status of noncompliant when an object is detected in the deployment path.

In some embodiments, the compliance status of noncompliant is conveyed by at least one of a visual indicator and an audible indicator.

In some embodiments, the visual indicator is configured to be visible to an occupant seated in the side facing passenger seat.

In some embodiments, the visual indicator is implemented as a beam of light projected to coincide with the deployment path.

In some embodiments, the information regarding the monitored deployment path includes object detection information, and the controller is further configured to instruct the indicator to indicate the compliance status of compliant when no object is detected in the deployment path.

In some embodiments, the compliance status of compliant is conveyed by at least one of a visual indicator and an audible indicator.

In some embodiments, the visual indicator is visible to an occupant seated in the side facing passenger seat.

In some embodiments, the visual indicator is implemented as a beam of light projected to coincide with the deployment path.

In some embodiments, the side facing seat is provided in an aircraft, the controller is further configured to activate the leg restraint system during taxi, takeoff, and landing of the aircraft, and the controller is further configured to deactivate the leg restraint system in an operating state of the aircraft other than during taxi, takeoff, and landing of the aircraft.

According to another aspect, the present disclosure provides an aircraft including a cabin, a side facing seat positioned in the cabin, and a leg restraint system associated with the side facing seat. The leg restrain system includes a leg restraining device configured to be positioned in proximity to the side facing seat, the leg restraining device including a panel configured to deploy along a deployment path. The system further includes a sensor configured to be positioned relative to the leg restraining device and monitor the deployment path, an indicator configured to indicate information regarding the monitored deployment path, and a controller communicatively coupled to each of the sensor and the indicator. In use, the controller is configured to receive information regarding the monitored deployment path, and instruct the indicator to indicate a compliance status associated with the monitored deployment path.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining embodiments of the inventive concepts disclosed herein in detail, it is to be understood that the inventive concepts disclosed herein are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, where applicable, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Broadly, the present disclosure provides devices, systems, and methods applicable to leg restraining devices implemented in a vehicle environment, for instance for use in conjunction with a side facing passenger seat in an aircraft cabin. As used herein, side facing refers to a seat generally facing perpendicular to the direction of travel. For example, a side facing seat may include, but is not limited to, a passenger seat, divan, couch etc., facing generally toward or away from an aircraft centerline. A leg restraining device according to the present disclosure refers to a device configured to deploy a brace, for instance a panel, in a forward direction relative to the seat associated with the leg restraining device. For example, in the case of a side facing seat facing the aircraft centerline, a forward direction means toward the aircraft centerline such that the brace extends, for example, into the space immediately forward of the seat, for instance into an aisle. The leg restraining device is typically positioned at the forward end of the seat, i.e., nearest the cockpit end of the aircraft, to restrain lower leg movements in the forward direction.

Figure 2A:
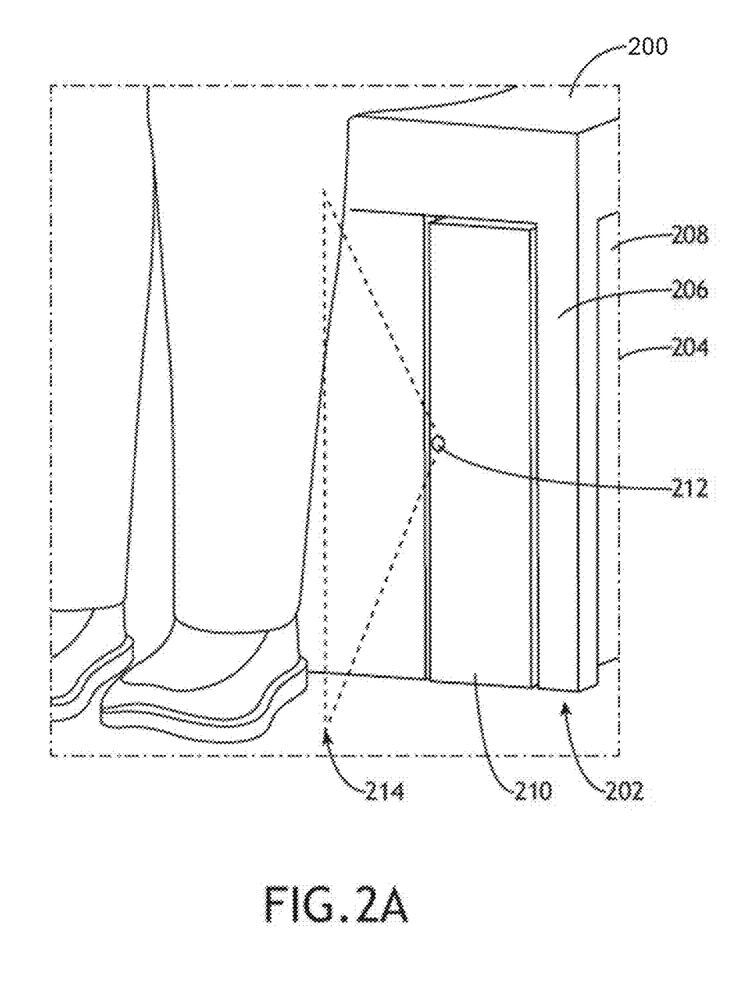
FIG. 2A is a detailed perspective view of a leg restraint system configured to monitor a deployment path of a leg restraint device in accordance with an embodiment of the present disclosure.
Figure 2B:
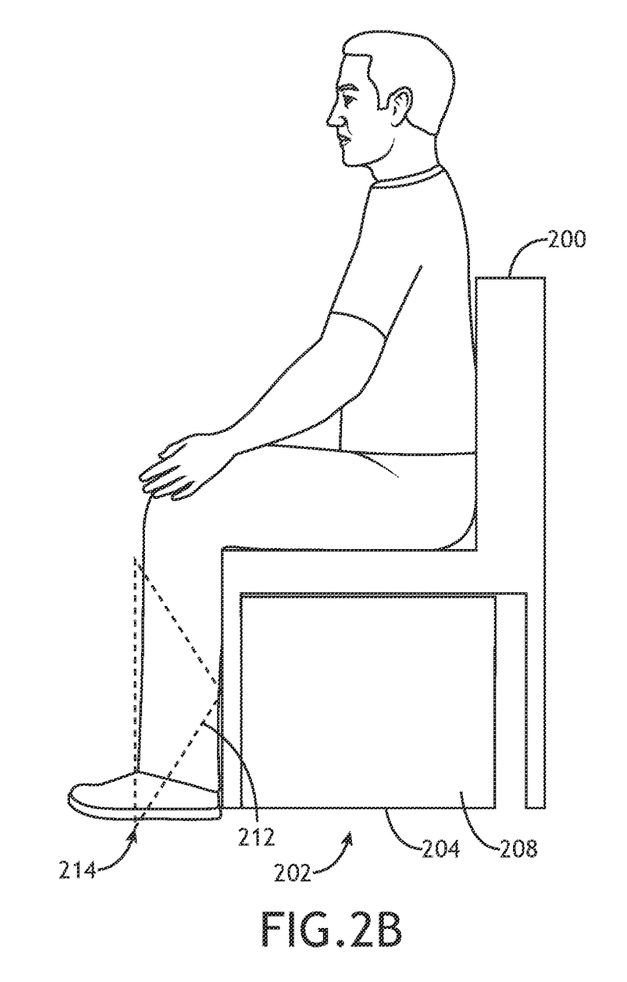
FIG. 2B is a side view of the side facing seat of FIG. 2A, showing the coverage area of the sensor.

FIGS. 2A and 2B illustrate schematically a side facing seat 200, for instance a side facing passenger seat in an aircraft cabin. The seat 200 is equipped with a leg restraint system 202 configured to activate to restrain, limit or otherwise control lower leg movements, such as lower leg lateral and rotational movements, during a sudden deceleration event. The system 202 generally includes a leg restraining device 204 configured to be positioned relative to the side facing seat 200. In some embodiments, the leg restraining device 204 is a unit configured to be positioned under the seat bottom, inward of a seat leg 206, to one side of the seat 200, etc. The leg restraining device 204 is generally positioned out of the space where the occupant's leg are presumed to be positioned during normal use of the seat during taxi, takeoff, and landing (TTOL).

In some embodiments, the leg restraining device 204 generally includes two principal elements, a housing 208 mounted under or directly to one side of the seat 200, and a deployable member such as a panel 210. During boarding, deplaning and normal flight, the panel 210 remains in a retracted condition within the housing 208. During an emergency that may result in an abrupt deceleration, the panel 210 is automatically deployed. When deployed, the panel 210 extends forward beyond the front of the seat 200 into a position where the legs of the seat occupant are positioned aft or behind the panel 210 in relation to the aircraft direction of forward travel. As such, when the aircraft decelerates abruptly, the deployed panel 210 interacts with the lower legs to prevent continued unrestrained forward motion. In some embodiments, the panel 210 may be deployed by different types of mechanisms including, but not limited to, spring mechanisms, pushers, airbags, etc. At the conclusion of the deceleration event, the leg restraining device 204 may be further configured to retract the panel 210 to clear the space forward of the seat of to facilitate egress. The types of deployment and retraction mechanisms of the leg restraining device 204 are not critical to the present invention.

The leg restraint system 202 further includes at least one sensor 212 configured to be positioned relative to the leg restraining device 204. In use, the at least one sensor 212 is configured to monitor the deployment path 214 of the panel 210. The deployment path 214 as shown includes the space to be occupied by the panel 210 when fully deployed forward of the seat 200. Sensor types suitable for monitoring the deployment path include, but are not limited to, vision and imaging sensors, proximity sensors, photoelectric sensors, motion sensors, non-contact sensors, etc. The number, type, and location of the sensor may depend on the capabilities of the sensor such as the field of view. The sensor(s) functions to detects objects positioned in and along the deployment path. Objects may include, but are not limited to, the lower legs of the seat occupant, luggage, personal items, and any other object that may interfere with the deployment of the panel 210 and intended use of the leg restraining device 204.

Figure 3:
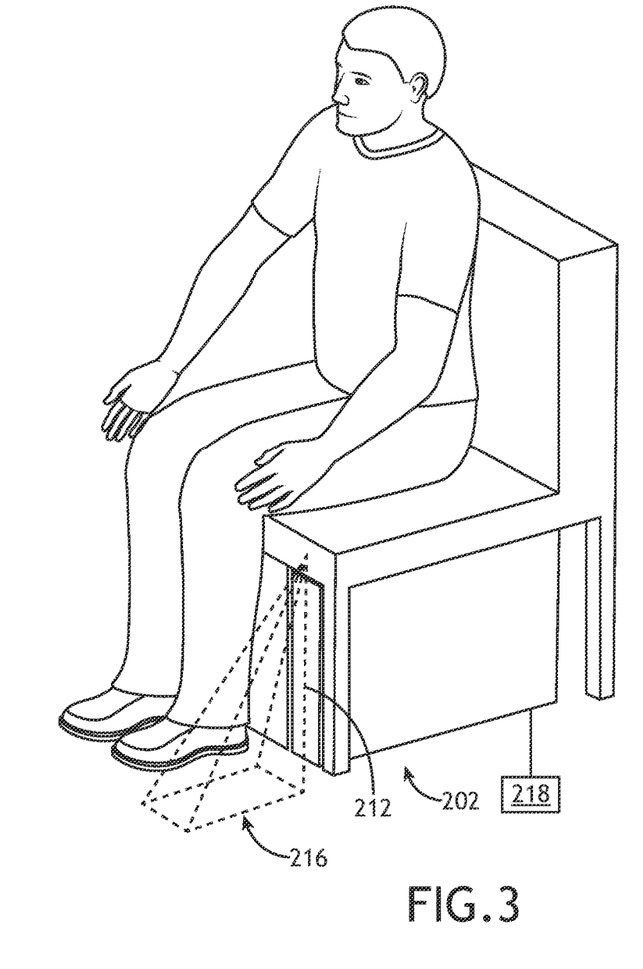
FIG. 3 is a perspective view of a side facing seat including a leg restraint system according to the present disclosure, showing an indicator configured to convey compliance status to the seat occupant, in accordance with an embodiment of the present disclosure.

Referring to FIG. 3, the leg restraint system 202 further includes an indicator 216 configured to indicate, display, otherwise convey information regarding the monitored deployment path 214. In some embodiments, the indicator 216 may be a visual and/or audible indicator. The indicator 216 may be configured to broadcast or otherwise convey information to the seat occupant, flight crew, cockpit, etc. The conveyed information pertains to the condition of the monitored deployment path 214. In some embodiments, the information includes compliance status information such as a compliant or noncompliant condition associated with the monitored deployment path 214. For example, a compliant status may correspond to a deployment path 214 that is free of objects, whereas a noncompliant status may correspond to a deployment path blocked by at least one object. For example, the nearest lower leg positioned out of the deployment path 214 would correspond to a compliant status whereas a nearest lower leg positioned in the deployment path 214 would correspond to a noncompliant status. A function of the indicator 216 may be to indicate to the seat occupant and/or the flight crew the presence of any object in the deployment path 214 such that corrective action can be taken to remove the detected object from the deployment path 214.

In some embodiments, the indicator 216 and the at least one sensor 212 may be packaged together or parts of a single component. In use, the at least one sensor 212 operates to detect a lower leg of the seat occupant in the deployment path 214. Information from the at least one sensor 212 is received by a controller 218 communicatively coupled to each of the at least one sensor 212 and the indicator 216. The controller 218 is operative to receive information from the at least one sensor 212 associated with the monitored deployment path 214, analyze the received information, and instruct the indicator 216 to operate according to the analyzed information.

In some embodiments, a deployment path status determined to be compliant causes the indicator 216 to be made inactive. In other embodiments, a deployment path status determined to be compliant causes the indicator 216 to convey positive feedback to the seat occupant and/or flight crew. For example, positive feedback may be implemented by a visual indication projected onto the floor in the deployment path, such as a green light or message indicating a compliant status. In some embodiments, a deployment path status determined to be noncompliant may cause the indicator 216 to be made active. For example, a deployment path status determined to be noncompliant may cause the indicator 216 to convey negative feedback to the seat occupant and/or flight crew such that corrective action can be taken. For example, negative feedback may be implemented by a visual indication projected onto the floor in the deployment path, such as a red light or message indicating the noncompliant status. In some embodiments, the indicator may be active when the monitored deployment path is determined noncompliant and made inactive when the monitored determined path is determined compliant.

In further embodiments, the indicator 216 may continuously indicate the location of the deployment path such that compliant behavior can be learned by the seat occupant. In a particular implementation, the indicator 216 may be configured to project a beam of light that coincides with the deployment path or a boundary thereof. In some embodiments, the controller 218 is further configured to activate the leg restraint system 202 during TTOL of the aircraft, and the controller 216 is further configured to deactivate the leg restraint system 202 in an operating state of the aircraft other than during TTOL of the aircraft.

Figure 4:
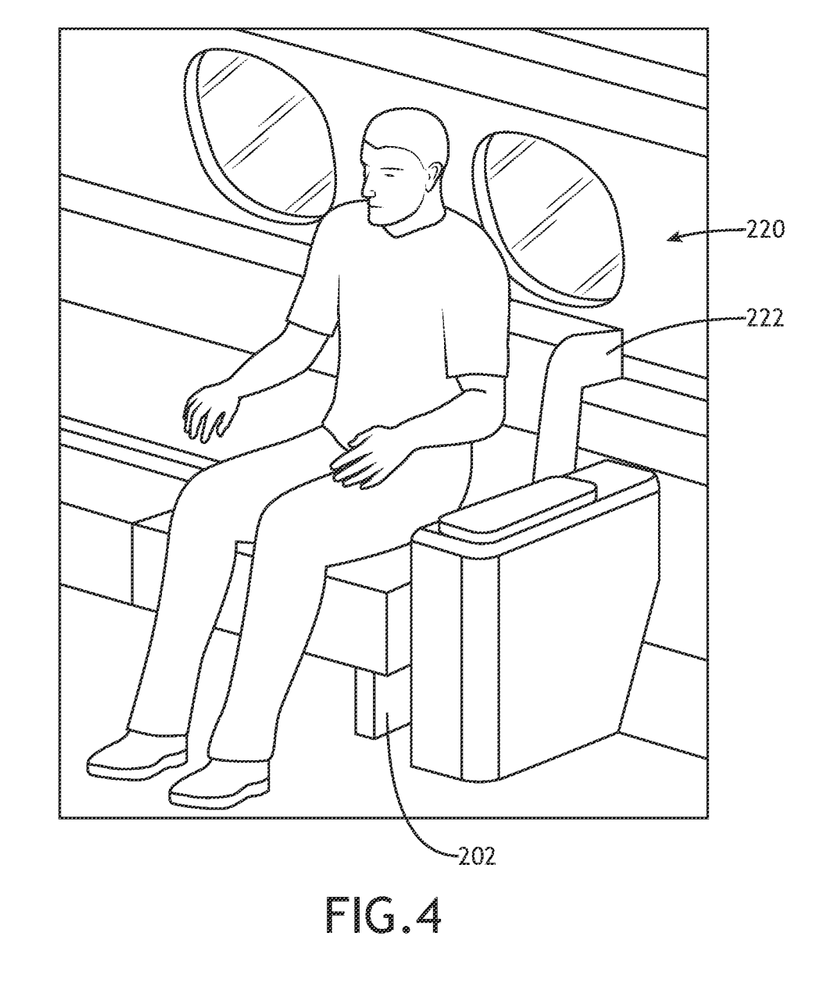
FIG. 4 is a perspective view of a section of an aircraft cabin including a side facing seat equipped with a leg restraint system, in accordance with an embodiment of the present disclosure.

FIG. 4 illustrates an aircraft passenger cabin 220 including a side facing divan 222 oriented facing the aircraft centerline, and a leg restraint system 202 as described above associated with the divan 222. The at least one sensor and indicator may be collocated with the leg restraining device or located elsewhere in the cabin 220 depending on the capabilities of the at least one sensor and type of indicator.

Figure 5:
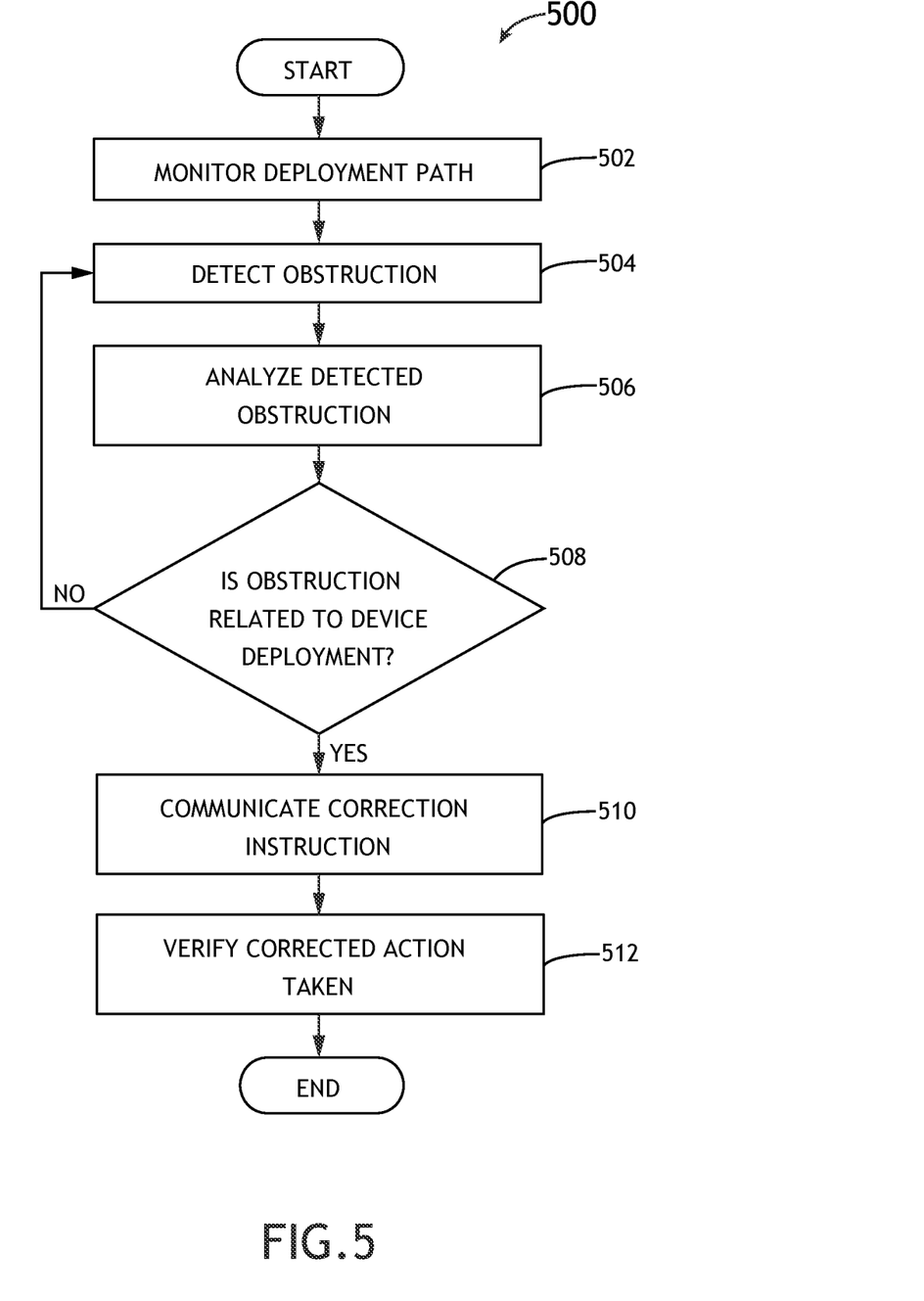
FIG. 5 is a flowchart illustrating a method, in accordance with an embodiment of the present disclosure.

FIG. 5 is a flowchart illustrating a method 500 for operating the leg restraint system according to the present disclosure. In a Step 502, the deployment path of the restraint device is continuously monitored by the at least one sensor as described above. In a Step 504, objects in the deployment path such as the lower leg are detected by the at least one sensor. In a Step 506, outputs from the at least one sensor are analyzed by the controller including a processor, wherein the controller is communicatively coupled to the at least one sensor. In a Step 508, the controller determines if the sensed object is associated with the device deployment. In a Step 510, if the object is determined to be associated with the device deployment, the controller communicates with the indicator and instructs the indicator to convey an indication of noncompliance. In a Step 512, the controller determines whether corrective action has been taken to change the status from noncompliant to compliant. Objects determined not to affect the device deployment, for instance passing objects, may be disregarded.

The controller (218 in FIG. 4) according to the present disclosure may be a digital computer that, in terms of hardware architecture, generally includes a processor, input/output (I/O) interfaces, a network interface, a data store, and memory. It should be appreciated by those of ordinary skill in the art that a practical embodiment of a controller may include additional components and suitably configured processing logic to support known or conventional operating features that are not described in detail herein. The components are communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The processor may be a hardware device for executing software instructions. The processor may be any custom made or commercially available processor, a central processing unit (CPU), an auxiliary processor among several processors associated with the server, a semiconductor-based microprocessor (in the form of a microchip or chip set), or generally any device for executing software instructions. When the controller is in operation, the processor is configured to execute software stored within the memory, to communicate data to and from the memory, and to generally control operations of the server pursuant to the software instructions. The I/O interfaces may be used to receive input from and/or for providing system output to one or more devices. I/O interfaces may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the controller to communicate on a network, such as a wide area network (WAN), a local area network (LAN), and the like, etc. The network interface may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface may include address, control, and/or data connections to enable appropriate communications on the network.

A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The radio enables wireless communication to an external device or network. Any number of suitable wireless data communication protocols, techniques, or methodologies can be supported by the radio, including, without limitation: RF; IrDA (infrared); Bluetooth; ZigBee (and other variants of the IEEE 802.15 protocol); IEEE 802.11 (any variation); IEEE 802.16 (WMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

Although the disclosure has been described with reference to the embodiments illustrated in the attached drawing figures, equivalents may be employed and substitutions made herein without departing from the scope of the claims.

What is claimed:

1. A leg restraint system for a side facing seat, comprising:
   a leg restraining device configured to be positioned in proximity to a side facing seat, the leg restraining device including a panel configured to deploy along a deployment path;
   a sensor configured to be positioned relative to the leg restraining device, the sensor configured to monitor the deployment path;
   an indicator configured to indicate information regarding the monitored deployment path; and
   a controller, communicatively coupled to each of the sensor and the indicator, the controller configured to:
   receive, from the sensor, information regarding the monitored deployment path; and
   instruct the indicator to indicate a compliance status associated with the monitored deployment path.

2. The leg restraint system according to claim 1, wherein:
   the information regarding the monitored deployment path includes object detection information; and
   the controller is further configured to instruct the indicator to indicate the compliance status of noncompliant when an object is detected in the deployment path.

3. The leg restraint system according to claim 2, wherein the compliance status of noncompliant is conveyed by at least one of a visual indicator and an audible indicator.

4. The leg restraint system according to claim 3, wherein the visual indicator is configured to be visible to an occupant seated in the side facing passenger seat.

5. The leg restraint system according to claim 3, wherein the visual indicator is implemented as a beam of light projected to coincide with the deployment path.

6. The leg restraint system according to claim 1, wherein:
   the information regarding the monitored deployment path includes object detection information; and
   the controller is further configured to instruct the indicator to indicate the compliance status of compliant when no object is detected in the deployment path.

7. The leg restraint system according to claim 6, wherein the compliance status of compliant is conveyed by at least one of a visual indicator and an audible indicator.

8. The leg restraint system according to claim 7, wherein the visual indicator is visible to an occupant seated in the side facing passenger seat.

9. The leg restraint system according to claim 7, wherein the visual indicator is implemented as a beam of light projected to coincide with the deployment path.

10. The leg restraint system according to claim 1, wherein:
the side facing seat is provided in an aircraft;
the controller is further configured to activate the leg restraint system during taxi, takeoff, and landing of the aircraft; and
the controller is further configured to deactivate the leg restraint system in an operating state of the aircraft other than during taxi, takeoff, and landing of the aircraft.

11. An aircraft, comprising:
a cabin;
a side facing seat positioned in the cabin; and
a leg restraint system associated with the side facing seat, the leg restraint system comprising:
a leg restraining device configured to be positioned in proximity to the side facing seat, the leg restraining device including a panel configured to deploy along a deployment path;
a sensor configured to be positioned relative to the leg restraining device, the sensor configured to monitor the deployment path;
an indicator configured to indicate information regarding the monitored deployment path; and
a controller, communicatively coupled to each of the sensor and the indicator, the controller configured to:
receive, from the sensor, information regarding the monitored deployment path; and
instruct the indicator to indicate a compliance status associated with the monitored deployment path.

12. The aircraft according to claim 11, wherein:
the information regarding the monitored deployment path includes object detection information; and
the controller is further configured to instruct the indicator to indicate the compliance status of noncompliant when an object is detected in the deployment path.

13. The aircraft according to claim 12, wherein the compliance status of noncompliant is conveyed by at least one of a visual indicator and an audible indicator.

14. The aircraft according to claim 13, wherein the visual indicator is configured to be visible to an occupant seated in the side facing passenger seat.

15. The aircraft according to claim 13, wherein the visual indicator is implemented as a beam of light projected to coincide with the deployment path.

16. The aircraft according to claim 11, wherein:
the information regarding the monitored deployment path includes object detection information; and
the controller is further configured to instruct the indicator to indicate the compliance status of compliant when no object is detected in the deployment path.

17. The aircraft according to claim 16, wherein the compliance status of compliant is conveyed by at least one of a visual indicator and an audible indicator.

18. The aircraft according to claim 17, wherein the visual indicator is configured to be visible to an occupant seated in the side facing passenger seat.

19. The aircraft according to claim 17, wherein the visual indicator is implemented as a beam of light projected to coincide with the deployment path.

20. The aircraft according to claim 11, wherein:
the controller is further configured to activate the leg restraint system during taxi, takeoff, and landing of the aircraft; and
the controller is further configured to deactivate the leg restraint system in an operating state of the aircraft other than during taxi, takeoff, and landing of the aircraft.

* * * * *